US012735841B2

(12) United States Patent
Larsson et al.

(10) Patent No.: US 12,735,841 B2
(45) Date of Patent: Sep. 15, 2026

(54) METHOD OF CONTROLLING THE DRYING OF CELLULOSE PULP IN A DRYING STEP OF A PULP PRODUCTION PROCESS

(71) Applicant: ANDRITZ TECHNOLOGY AND ASSET MANAGEMENT GMBH, Graz (AT)

(72) Inventors: Ola Larsson, Växjö (SE); Johan Niklasson, Växjö (SE)

(73) Assignee: ANDRITZ TECHNOLOGY AND ASSET MANAGEMENT GMBH, Graz (AT)

( * ) Notice: Subject to any disclaimer, the term of this patent is extended or adjusted under 35 U.S.C. 154(b) by 641 days.

(21) Appl. No.: 18/033,381

(22) PCT Filed: Oct. 21, 2021

(86) PCT No.: PCT/EP2021/079257
§ 371 (c)(1),
(2) Date: Apr. 24, 2023

(87) PCT Pub. No.: WO2022/090058
PCT Pub. Date: May 5, 2022

(65) Prior Publication Data

US 2023/0407567 A1 Dec. 21, 2023

(30) Foreign Application Priority Data

Oct. 26, 2020 (SE) .................................... 2051248-9

(51) Int. Cl.
*D21G 9/00* (2006.01)
*D21C 9/18* (2006.01)
(Continued)

(52) U.S. Cl.
CPC ............. *D21G 9/0036* (2013.01); *D21C 9/18* (2013.01); *D21F 5/18* (2013.01); *F26B 13/12* (2013.01); *F26B 21/30* (2026.01)

(58) Field of Classification Search
CPC .......... D21G 9/0036; D21C 9/18; D21F 5/18; F26B 13/12; F26B 21/06; F26B 13/06; F26B 13/10; G01N 33/34
See application file for complete search history.

(56) References Cited

U.S. PATENT DOCUMENTS 4,314,878 A * 2/1982 Lee ...................... D21G 9/0036 162/DIG. 11
6,792,331 B1 * 9/2004 Hamstrom ................ D21F 5/00 700/36

(Continued)

FOREIGN PATENT DOCUMENTS

CA 3114022 A1 5/2026
EP 1404919 B1 8/2006

(Continued)

OTHER PUBLICATIONS

International Search Report for PCT/EP2021/079257, Prepared by the European Patent Office, mailing date Feb. 4, 2022, 4 pages.

(Continued)

*Primary Examiner* — Abbas Rashid
*Assistant Examiner* — Elisa H Vera
(74) *Attorney, Agent, or Firm* — Brooks Kushman P.C.

(57) ABSTRACT

A method of controlling the drying of cellulose pulp in a drying step of a pulp production process. The method including measuring a plurality of process parameters in at least one previous process step; calculating, based on said process parameters, a drying predictive index indicative of the characteristic of a portion of cellulose pulp processed in said previous process step; determining, based on said drying predictive index, at least one drying parameter for drying of said portion of cellulose pulp; and controlling the drying of said portion of cellulose pulp using said drying parameter.

11 Claims, 2 Drawing Sheets

(51) Int. Cl.

| | |
|---|---|
| ***D21F 5/18*** | (2006.01) |
| ***F26B 13/12*** | (2006.01) |
| ***F26B 21/30*** | (2026.01) |

(56) References Cited

U.S. PATENT DOCUMENTS

| | | | | |
|---|---|---|---|---|
| 2004/0025369 | A1 | 2/2004 | Luukkanen | |
| 2008/0073043 | A1 | 3/2008 | Greschik et al. | |
| 2013/0203699 | A1 * | 8/2013 | Nonni | D21H 11/16<br>514/57 |
| 2022/0034037 | A1 | 2/2022 | Larsson | |

FOREIGN PATENT DOCUMENTS

| | | | |
|---|---|---|---|
| EP | 1404919 | B2 | 10/2010 |
| WO | 2012074462 | A1 | 6/2012 |
| WO | 2020064738 | A1 | 4/2020 |

OTHER PUBLICATIONS

Brazilian Office Action and Search Report for PCT Application PCT/EP2021/079257. 5 pages.

Larsson et al., "Chapter 10—Pulp drying applications", In: Papermaking Science and Technology, Book 6A—Chemical Pulping, Jan. 1, 1999, XP055555596, pp. A666-A686, p. A681, paragraph 2.1.6, 13 pages.

* cited by examiner

METHOD OF CONTROLLING THE DRYING OF CELLULOSE PULP IN A DRYING STEP OF A PULP PRODUCTION PROCESS

CROSS-REFERENCE TO RELATED APPLICATION

This application is the U.S. national phase of PCT Application No. PCT/EP2021/079257 filed on Oct. 21, 2021, which claims priority to SE Patent Application No. 2051248-9 filed on Oct. 26, 2020, the disclosures of which are incorporated in their entirety by reference herein.

TECHNICAL FIELD OF THE INVENTION

The present invention relates to a method of controlling the drying of cellulose pulp in a drying step of a pulp production process.

BACKGROUND ART

In the drying step of a cellulose pulp production process, cellulose pulp is normally dewatered and then further dried in a dryer having several superposed horizontal drying decks. The dewatering normally comprises a forming section, a wire section and a press section, in which the dryness of the pulp is successively raised. Cellulose pulp having about 50% water content is fed into the pulp dryer. A web of cellulose pulp is conveyed across the drying decks of the dryer. Dry cellulose pulp, having about 10% water content, is outputted at the end of the lowest drying deck. An example of such a cellulose pulp dryer is illustrated in WO 2012/074462 A1.

Unexpected shutdowns in different stages of the drying step may occur, e.g. if the web is broken. Then, a web tail must be threaded through sections of the drying line. Threading is time-consuming, in particular for large pulp dryers, and in the meantime no pulp is produced, which is cost-ineffective. Hence, there is a need for avoiding frequent threading procedures.

SUMMARY OF THE INVENTION

It is an object of the present invention to provide an improved method of controlling the drying of cellulose pulp in a drying step of a pulp production process.

This and other objects that will be apparent from the following summary and description are achieved by a method according to the appended claims.

According to one aspect of the present disclosure there is provided a method of controlling the drying of cellulose pulp in a drying step of a pulp production process, said method comprising measuring a plurality of process parameters in at least one previous process step; calculating, based on said process parameters, a drying predictive index indicative of the characteristic of a portion of cellulose pulp processed in said previous process step; determining, based on said drying predictive index, at least one drying control parameter for drying of said portion of cellulose pulp; and controlling the drying of said portion of cellulose pulp using said drying parameter.

The drying predictive index enables to, well in advance of the drying step of a pulp production process, predict that a pulp portion will require to be dried in a certain manner to e.g. avoid that it is broken somewhere in the drying line. Hence, deviations detected at an early stage of the pulp production process may be taken into consideration when determining drying parameters for a specific pulp portion. The drying predictive index thus enables to adapt drying conditions to compensate for deviations occurring upstream of the drying step. Hence, the determined drying parameters are used after a predetermined time interval when the pulp portion, for which they are determined, enters the drying step and is dried in different sections thereof. This has the advantage that the risk of web break is eliminated or at least reduced. Furthermore, unplanned or accidental shutdowns of the drying line may be avoided, which provides for efficient pulp drying and pulp production. Also, the drying predictive index enables to predict that a portion of pulp may be dried at a higher web speed than a nominal web speed. Hence, based on the drying predictive index, it may be concluded that a certain pulp portion is allowed to be dried at a higher web speed than what is normally used in the drying line, which will improve the throughput of the drying line. To summarize, the method provides for a very reliable and efficient control of a drying step of a pulp production process. Process parameter measurements are thus utilized to, in a predictive manner, determine appropriate drying parameters for a certain portion of pulp.

According to one embodiment, the step of measuring process parameters comprises measuring at least the delignification level of said portion of pulp and/or the pH of said portion of pulp and/or the amount of chemicals used in earlier steps of the pulp production process.

According to one embodiment the step of determining at least one drying parameter comprises determining at least a web speed, and/or a basis weight and/or nip loads and/or a steam pressure.

According to one embodiment said drying predictive index is calculated as a function of said measured process parameters.

According to one embodiment said step of measuring a plurality of process parameters comprises measuring a plurality of process parameters in a cooking step and/or an oxygen delignification step and/or a bleaching step.

According to one embodiment said drying predictive index is calculated based on process parameters measured in each of a cooking step, an oxygen delignification step and a bleaching step, which enables even further optimization of drying parameters, since deviations may occur in one or more of the previous steps of the pulp production process.

According to one embodiment, for a portion of pulp for which a drying predictive index above a predetermined lower level L1 and below a predetermined upper level L2 is calculated, it is determined to control the drying using normal drying parameter(s).

According to one embodiment, for a portion of pulp for which a predictive drying index below a predetermined level L1 is calculated, it is determined to control the drying step using adapted drying control parameter(s), such as, e.g., adjusted web speed and/or basis weight and/or nip loads and/or steam pressure.

According to one embodiment, for a portion of pulp for which a drying predictive index above a predetermined level L2 is calculated, it is determined to control the drying step using adapted drying control parameter(s), such as, e.g., increased web speed.

Based on the drying predictive index, drying parameters may thus be adapted to compensate for undesirable pulp characteristic or to utilize that pulp has a characteristic that allows e.g. increased web speed in the drying step.

These and other aspects of the invention will be apparent from and elucidated with reference to the claims and the embodiments described hereinafter.

BRIEF DESCRIPTION OF THE DRAWINGS

The invention will now be described in more detail with reference to the appended drawings in which.

DETAILED DESCRIPTION OF PREFERRED EMBODIMENTS OF THE INVENTION

Typically, a pulp production process comprises a cooking step, an oxygen delignification step, a bleaching step and a drying step carried out in different units of a pulp production plant. In the drying step, which is carried out in a drying line of the pulp production plant, cellulose pulp is normally dewatered and then further dried in a pulp dryer.

The drying line receives bleached pulp from a bleaching unit. The dewatering normally comprises a web forming section, a wire section and a press section, in which the dryness of the pulp is successively raised.

In the last stage of the drying step, a cellulose pulp dryer for drying cellulose pulp in accordance with the air borne web principle where cellulose pulp is dried by means of hot air while travelling along horizontal drying sections of the pulp dryer may be used. Such a dryer thus utilizes heated air to dry and support the pulp web. Typically, a dryer would comprise 4-40 drying decks.

A wet pulp web enters the dryer at a certain web speed via an inlet arranged in a first side wall of the pulp dryer housing. The pulp web is fed through the housing from the inlet and travels, in a zigzag manner at a set web speed, from the top to the bottom of the dryer. The dried web leaves the dryer via an outlet arranged in a second side wall of the pulp dryer housing.

A pulp drying control unit is arranged to control the drying step, i.e. dewatering and drying in a dryer, of the pulp production process. The drying is controlled based on several drying parameters, such as, e.g., web speed, basis weight, nip loads and steam pressure.

During operation of such a pulp production plant several process parameters are measured continuously in a conventional manner. Further, a control unit is arranged to receive such process parameter continuously or regularly. For example, the delignification level and pH of processed pulp and the amount of added chemicals are measured and transmitted to the control unit regularly during pulp production in a pulp production plant. Hence, in each step of the pulp production process a plurality of process parameters are measured and transmitted regularly to the control unit of the pulp production plant.

Figure 1:
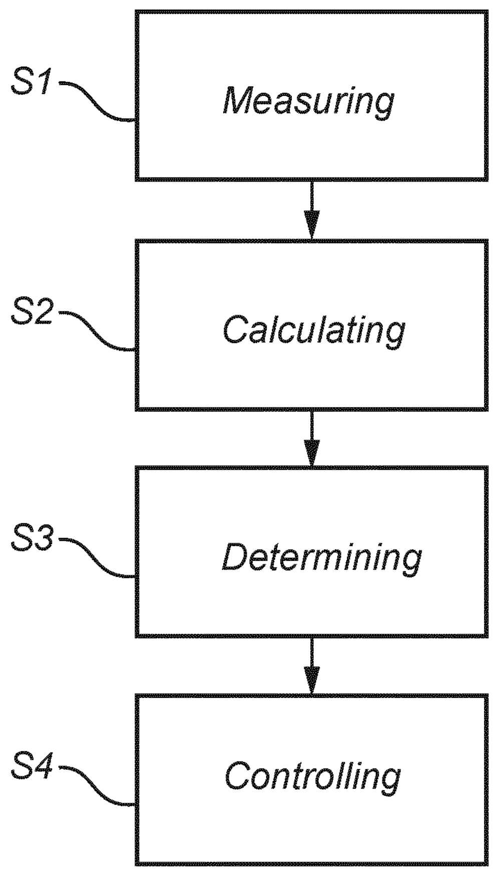
FIG. 1 illustrates steps of a method according to an embodiment of the present disclosure.

With reference to FIG. 1, a method of controlling the drying of cellulose pulp in a drying step of a pulp production process according to the present disclosure will now be described.

In a measuring step S1, a plurality of process parameters in at least one previous process step, are first measured using sensors located at different locations of the pulp production plant. Process parameter measurements related to a certain portion of pulp are transmitted to a control unit of the pulp production plant. Typically, process parameters, such as, e.g., the delignification level and/or the pH and/or the amount of chemicals are measured regularly and transmitted to the control unit. By way of an example, process parameter measurements related to a first pulp portion situated in the cooking step are measured and transmitted to the control unit of the pulp production plant. Preferably, a plurality of process parameters for such a portion of pulp are measured in each of the previous process steps, i.e. in the cooking step, the oxygen delignification step and the bleaching step.

Then, in a calculating step S2, a drying predictive index (DPI) indicative of the characteristic of a portion of cellulose pulp being processed in a previous process step is calculated based on the process parameter measurements measured in step S1. Hence, a drying predictive index is calculated based on the process parameter measurements related to the first pulp portion.

A drying predictive index (DPI) equal to zero indicates that the dryability of the portion of pulp for which the DPI is calculated is as expected. Such pulp may thus, when it enters the drying step, be dried using normal control parameters.

A drying predictive index (DPI) below zero may indicate that the portion for which the DPI is calculated will be hard, or even very hard, to dry and that the drying need to be controlled in a certain manner, i.e. operated with certain drying parameter(s) in the different sections of the drying line. A drying predictive index (DPI) below a predetermined level L1 indicates that the portion of pulp for which the DPI is calculated will be very hard to dry and that it will require even further adaption of drying parameter(s) compared to what is needed if the DPI is between zero and L1. Hence, when the calculated DPI is equal to L1 or less, certain drying parameters that may not be needed if the DPI is between zero and L1, is determined.

A drying predictive index (DPI) above zero may indicate that the portion of pulp for which the DPI is calculated will be easy to dry later on in the pulp production process. A drying predictive index above a predetermined level L2 indicates that the portion of pulp for which the DPI is calculated will be very easy to dry and that parameter(s), such as e.g. higher web speed, that will increase the throughput of the drying line may be used for the actual portion of pulp.

In a determining step S3, at least one drying parameter for the drying of a certain portion of pulp, i.e. the one for which process parameter measurements has been established, is then determined based on the DPI calculated in step S3. Typically, drying parameter(s), such as, e.g., web speed and/or a basis weight and/or nip loads and/or a steam pressure is/are determined. In this embodiment, the web speed is determined.

Finally, in a controlling step S4, drying of the actual portion of pulp is controlled using the determined drying parameter(s), e.g., as in this case, a determined web speed. The controlling step S4 may be carried out automatically by the drying control unit, which is connected to, or form a part of, the control unit of the pulp production plant or by an operator of the drying line.

Hence, the delignification level and/or the pH and/or the amount of chemicals may be measured and used to calculate a DPI. The DPI may be calculated as a function of the measured process parameters, i.e. as a function of measured delignification level and/or the pH and/or the amount of chemicals used in earlier steps of the pulp production process.

Figure 2:
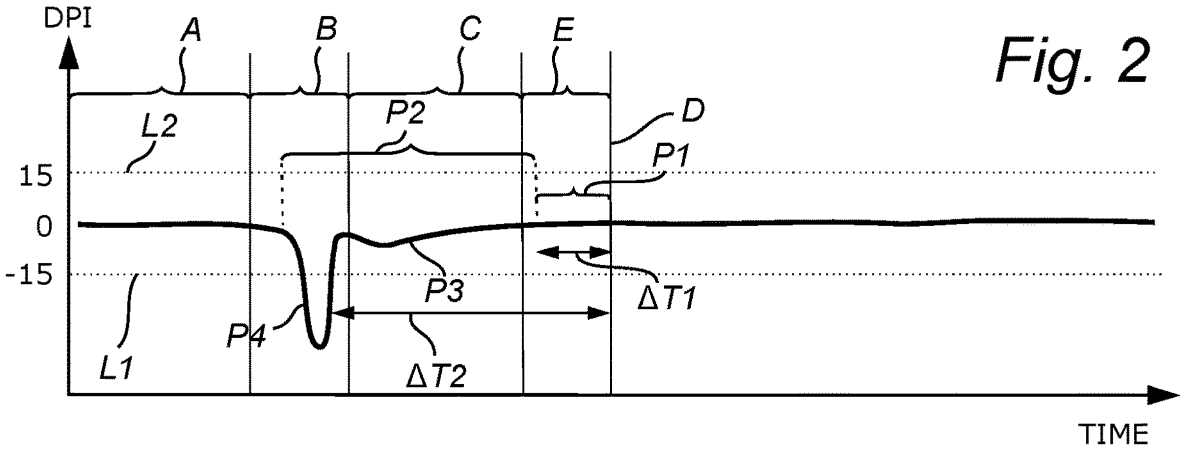
FIG. 2 illustrate calculated drying predictive index at a first occasion of a pulp production process.
Figure 3:
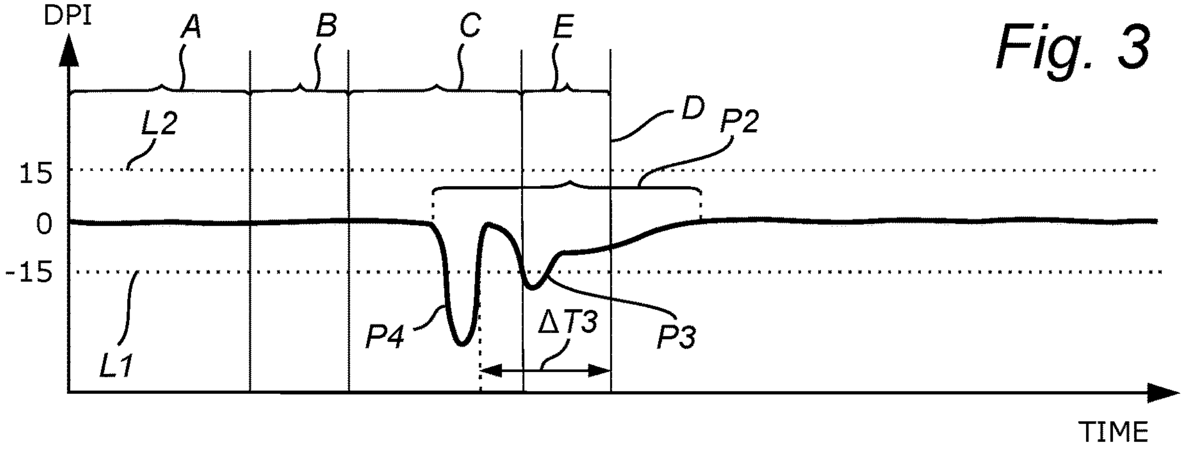
FIG. 3 illustrate calculated drying predictive index at a second occasion of a pulp production process.
Figure 4:
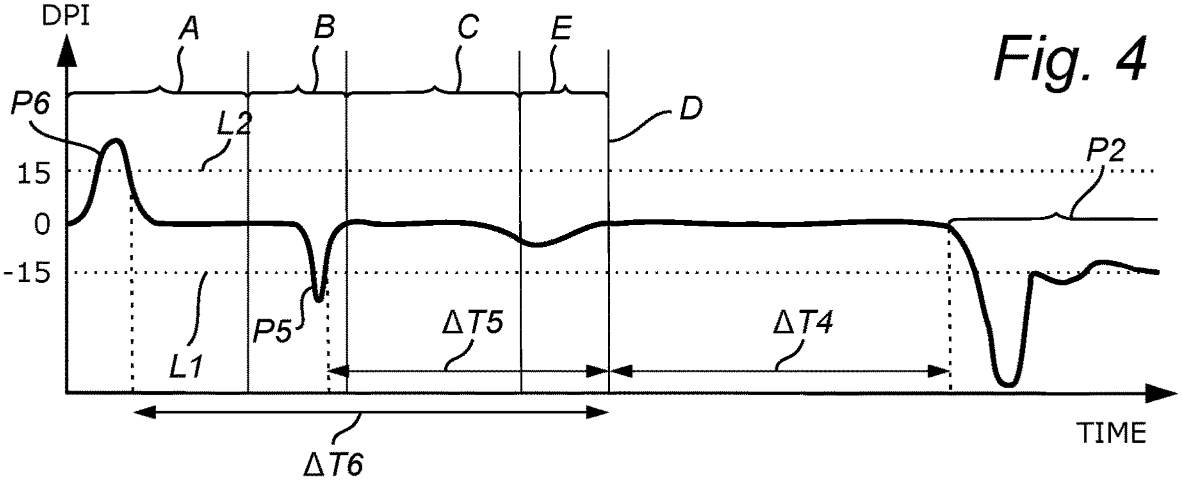
FIG. 4 illustrate calculated drying predictive index at a third occasion of a pulp production process.

With reference to FIGS. 2-4, a method of controlling the drying step of a pulp production process according to an embodiment of the present disclosure will be further described and exemplified hereinafter.

The pulp production process comprises a cooking step A, an oxygen delignification step B, a bleaching step C and a drying step D, as illustrated in FIG. 2. Before entering the drying step D, pulp is stored in a tower for a period of time, as illustrated by E in FIG. 2.

A drying predictive index (DPI) may be calculated and monitored continuously during the pulp production process.

FIG. 2 illustrates calculated DPI for pulp in different steps A, B, C, D of the pulp production process. The DPI indicates a characteristic of pulp and enables to identify problematic pulp, i.e. pulp that will be hard to dry, that may require certain drying parameters later in the process when the actual pulp portion is to be dried in the drying step. Also, the drying predictive index may be used to identify portions of pulp that may allow a higher web speed through the drying line.

A DPI is thus calculated for a specific pulp portion and used to determine appropriate drying parameters for the actual pulp portion to be used when it enters the drying step. For instance, for a pulp portion that is in the cooking step A, a DPI is calculated based on process parameters measurements of the actual pulp portion. At this stage, the DPI for the actual pulp portion is thus calculated based on measurements in the cooking step A only. When the same pulp portion enters the oxygen delignification step B an updated DPI is calculated based on the DPI that was calculated for the actual pulp portion in the cooking step A and process parameter measurements of the pulp in the oxygen delignification step B. When the same pulp portion enters the bleaching step C, a further updated DPI is calculated based on a DPI that was calculated for the actual pulp portion in the cooking step A, a DPI that was calculated for the actual pulp portion in the oxygen delignification step B and process parameter measurements of the pulp in the bleaching step C. A DPI for a certain pulp portion calculated in the third step, i.e. in the bleaching step C, may thus form a better prediction or basis for determining drying parameters for an actual pulp portion than a drying predictive index calculated for the actual pulp portion when it was situated in the first step, i.e. in the cooking step A, of the pulp production process, since more information about the actual pulp portion is available and may be taken into consideration.

In this case, for a first batch of pulp P1, that is about to enter the drying step D, the DPI is equal to zero, which indicates that this pulp portion, when it enters the drying step D, may be dried using normal drying parameters. The dryability of this portion of pulp is thus as expected. In this case it is thus determined to use normal drying parameters. The drying of the first batch of pulp P1 is thus controlled using normal drying parameters.

For a second batch of pulp P2, a part P3 of which is in the bleaching step C and a part P4 of which is in the oxygen delignification step B, the DPI is below zero, and even partly below L1, which indicates that this batch of pulp has an undesired characteristic and requires certain drying parameters, to compensate for the undesired pulp characteristic, in order to avoid a potential unplanned shutdown later on in the dryer. The first part P3 of the problematic batch P2 will enter the drying step D after a certain time interval, as illustrated by ΔT1 in FIG. 2, and the most problematic part P4 will enter the drying step D after a longer period of time, as illustrated by ΔT2 in FIG. 2. Hence, if a problematic batch of pulp, i.e. a pulp portion having an undesired pulp characteristic, is identified, certain drying parameters, that are to be used when the problematic batch of pulp enters the dryer, are determined. In the current situation, it may be determined to maintain the web speed at a normal level for a first part of the batch of pulp P2 and reduce the web speed to a level below a normal level for a second part of the batch of pulp P2, in order to avoid a shutdown in the drying line when the problematic pulp is dried. Later, the drying of the problematic batch of pulp P2 may thus be controlled using the drying parameters determined based on the drying predictive index.

FIG. 3 illustrates calculated drying predictive index of pulp in the pulp production process at an occasion a number of hours after the occasion illustrated in FIG. 2. At this occasion an initial part of the problematic batch of pulp P2 entered the drying step D, while the most problematic part P4 is the bleaching step C. The problematic batch of pulp P2 has thus entered and partly passed the oxygen delignification step B. As the problematic batch of pulp P2 entered and partly passed the oxygen delignification step B more attributes, in the form of further process parameter measurements, in the calculation of an updated DPI has caused a slight change in the DPI compared to the occasion illustrated in FIG. 2, which is evident from FIG. 3 by comparing the shape of the curve in FIG. 3 with the shape of the curve in FIG. 2. The part P4 of the batch of problematic pulp P2 that earlier, when it was in the delignification step B, was identified to be very hard to dry is still identified as very hard to dry, since the DPI is below L1. Now, the DPI calculated for the first part P3 of the problematic batch of pulp P2 is partly below L2, which indicates that certain drying parameters may be needed also for this part. Typically, in this situation, it is determined to adjust the web speed and/or basis weight and/or nip loads and/or steam pressure, since e.g. undesired web movements may be expected. The most problematic part P4 will enter the drying step D after a certain time, as illustrated by ΔT3 in FIG. 3.

FIG. 4 illustrates calculated drying predictive index of pulp in the pulp production process a number of hours after the problematic batch of pulp P2 has left the drying step D, as illustrated by ΔT4. Still, there is some small disturbances, identified by a DPI below zero for a portion of pulp P5 situated in the delignification step B, indicating that the pulp production process is still not fully stable. The batch of pulp P5, for which a DPI below L1 is calculated will enter the drying step D after a certain period of time, as illustrated by ΔT5 in FIG. 4. Typically, in such a situation, drying parameters that establish stable drying conditions should be determined rather than drying parameters that increases the throughput of the drying line. Hence, normal drying parameters should be used rather than e.g. increased web speed. Also, it may be determined to reduce the web speed and/or to adjust the turning rolls of the dryer when the batch of pulp P5 is approaching the drying step D.

For a further batch of pulp, illustrated by P6 in FIG. 4, a positive DPI above the second predetermined level L2 is calculated, which indicates that it will be very easy to dry. The batch of pulp P6, for which a DPI above L2 is calculated, will enter the drying step D after a certain period of time, as illustrated by ΔT6 in FIG. 4. Then, the drying step may be controlled using drying parameters, such as e.g. increased web speed, that increases the throughput of the drying step. Hence, in this situation, it is determined to increase the web speed when the batch of pulp P5, for which a DPI above L2 has been calculated, enters the drying step D.

By way of an example, for pulp portions, for which a DPI above a predetermined lower level L1 and below a predetermined upper level L2, it is determined to control the drying step using normal drying parameters, for a pulp portion for which a DPI below L1 is calculated, it is determined to control the drying step using adapted drying parameters, such as, e.g., reduced web speed, and for a pulp portion above L2 is calculated, it is determined to control the drying step using adapted drying parameters, such as, e.g, increased web speed.

The person skilled in the art realizes that the present invention by no means is limited to the embodiments described above. On the contrary, many modifications and variations are possible within the scope of the appended claims.

The invention claimed is:

1. A method of controlling the drying of cellulose pulp in a drying step of a pulp production process of a pulp production plant, the pulp production process further including a cooking step, an oxygen delignification step, and a bleaching step which are to process the cellulose pulp prior to the drying of the cellulose pulp in the drying step, the method comprising:

measuring, using at least one sensor located in the pulp production plant, a plurality of process parameters for a portion of the cellulose pulp in at least one of the cooking step, the oxygen delignification step, and the bleaching step as the portion of the cellulose pulp is being processed in the at least one of the cooking step, the oxygen delignification step, and the bleaching step;

calculating, by a controller of the pulp production plant, based on the process parameters, a drying predictive index indicative of a characteristic of the portion of the cellulose pulp;

determining, by the controller, based on the drying predictive index, at least one drying parameter for drying of the portion of the cellulose pulp; and controlling, by the controller, the drying of the portion of the cellulose pulp using the drying parameter as the portion of the cellulose pulp is being dried in the drying step.

2. The method according to claim 1, wherein the step of measuring process parameters for the portion of the cellulose pulp comprises measuring at least the delignification level of the portion of the cellulose pulp and/or the pH of the portion of the cellulose pulp and/or the amount of chemicals used in the at least one of the cooking step, the oxygen delignification step, and the bleaching step.

3. The method according to claim 1, wherein the step of determining at least one drying parameter comprises determining at least a web speed, and/or a basis weight and/or nip loads and/or a steam pressure with the step of controlling the drying of the portion of the cellulose pulp including controlling the web speed and/or the basis weight and/or the nip loads and/or the steam pressure associated with the portion of the cellulose pulp.

4. The method according to claim 1, wherein the drying predictive index is calculated based on process parameters measured in each of the cooking step, the oxygen delignification step and the bleaching step of the pulp production process.

5. The method according to claim 1, wherein for a portion of the cellulose pulp for which a drying predictive index above a predetermined lower level (L1) and below a predetermined upper level (L2), it is determined to control the drying step using normal drying parameter(s).

6. The method according to claim 1, wherein for a portion of the cellulose pulp for which a drying predictive index below a predetermined level (L1) is calculated, it is determined to control the drying step using adapted drying control parameter(s).

7. The method according to claim 1, wherein for a portion of the cellulose pulp for which a drying predictive index above a predetermined level (L2) is calculated, it is determined to control the drying step using adapted drying control parameter(s).

8. The method according to claim 1, further comprising:

measuring, using the sensor, a plurality of process parameters for a second portion of the cellulose pulp in at least one of the cooking step, the oxygen delignification step, and the bleaching step as the second portion of the cellulose pulp is being processed in the at least one of the cooking step, the oxygen delignification step, and the bleaching step;

calculating, by the controller, based on the process parameters for the second portion of the cellulose pulp, a second drying predictive index indicative of a characteristic of the second portion of the cellulose pulp, wherein the drying predictive indexes are different than one another;

determining, by the controller, based on the second drying predictive index, at least one drying parameter for drying of the second portion of the cellulose pulp; and controlling, by the controller, the drying of the second portion of the cellulose pulp using the drying parameter for the second portion of the cellulose pulp as the second portion of the cellulose pulp is being dried in the drying step.

9. The method according to claim 1, wherein the cooking step is prior to the oxygen delignification step which is prior to the bleaching step which is prior to the drying step, wherein:

the drying predictive index is calculated based on the process parameters measured in the cooking step.

10. The method according to claim 9, wherein:

the drying predictive index is calculated based on the process parameters measured in the cooking step and in the oxygen delignification step.

11. The method according to claim 10, wherein:

the drying predictive index is calculated based on the process parameters measured in the cooking step, in the oxygen delignification step, and in the bleaching step.

* * * * *